(12) United States Patent
Vervaeke

(10) Patent No.: US 12,070,017 B2
(45) Date of Patent: Aug. 27, 2024

(54) TRANSFER MACHINE AND USE THEREOF IN A POULTRY HOUSE FOR TRANSFERRING INCUBATED EGGS TO A FLOOR THEREOF

(71) Applicant: VERVAEKE-BELAVI, Tielt (BE)

(72) Inventor: Steven Vervaeke, Tielt (BE)

(73) Assignee: VERVAEKE-BELAVI, Tielt (BE)

( * ) Notice: Subject to any disclaimer, the term of this patent is extended or adjusted under 35 U.S.C. 154(b) by 271 days.

(21) Appl. No.: 17/608,968

(22) PCT Filed: May 20, 2020

(86) PCT No.: PCT/IB2020/054801
§ 371 (c)(1),
(2) Date: Nov. 4, 2021

(87) PCT Pub. No.: WO2020/240355
PCT Pub. Date: Dec. 3, 2020

(65) Prior Publication Data
US 2022/0361457 A1    Nov. 17, 2022

(30) Foreign Application Priority Data
May 24, 2019 (BE) .................................. 2019/5343

(51) Int. Cl.
*A01K 31/16* (2006.01)
*A01K 41/00* (2006.01)

(52) U.S. Cl.
CPC ............ *A01K 31/165* (2013.01); *A01K 41/00* (2013.01)

(58) Field of Classification Search
CPC .... A01K 31/165; A01K 31/16; A01K 45/007; A01K 31/18; A01K 43/00; A01K 41/00
(Continued)

(56) References Cited

U.S. PATENT DOCUMENTS 2,903,290 A * 9/1959 Morris .................... A01K 43/00
                                                    53/247
3,013,833 A * 12/1961 Gwin ....................... B65B 23/08
                                                    356/61
3,077,993 A * 2/1963 Mulvany .............. B65G 47/918
                                                    414/737

(Continued)

FOREIGN PATENT DOCUMENTS

| BE | 1023719 B1 | 6/2017 |
| NL | 2004696 C2 | 11/2011 |
| WO | 2019/007741 A1 | 1/2019 |

OTHER PUBLICATIONS

International Search Report issued in corresponding International Patent Application No. PCT/IB/2020/054801 dated Sep. 9, 2020.

*Primary Examiner* — Brady W Frazier
*Assistant Examiner* — Zoe Tam Tran
(74) *Attorney, Agent, or Firm* — Morgan, Lewis & Bockius LLP

(57) ABSTRACT

The transfer machine comprises an input and output system (8) for inserting trays filled with incubated eggs into the transfer machine and for removing the emptied trays therefrom and a transfer system (9) for transferring the eggs from the trays to the floor of the poultry house. The transfer system (9) comprises a set of egg pickup members (28) mounted on a first sub-frame (30). The first sub-frame (30) is mounted on a second sub-frame (31) such that it can move up and down, the second sub-frame mounted on the frame (5) of the machine such that it can move back and forth between a first position, wherein the set of egg pickup members (28) is above the filled trays that have been inserted, and a second position, wherein the set of egg pickup members (28) is above the floor of the poultry house.

13 Claims, 11 Drawing Sheets

(58) Field of Classification Search
USPC .......................................... 119/440, 6.8, 322
See application file for complete search history.

(56) References Cited

U.S. PATENT DOCUMENTS

| | | | | | |
|---|---|---|---|---|---|
| 3,230,001 | A | * | 1/1966 | Hirt | B65B 23/08 |
| | | | | | 414/791.7 |
| 3,929,234 | A | * | 12/1975 | Warren | B65B 23/08 |
| | | | | | 53/247 |
| 3,934,916 | A | * | 1/1976 | Baker | A21B 3/18 |
| | | | | | 271/106 |
| 4,344,730 | A | * | 8/1982 | Dvorak | A01K 43/00 |
| | | | | | 414/405 |
| 4,411,574 | A | * | 10/1983 | Riley | B65B 21/20 |
| | | | | | 414/416.07 |
| 4,787,812 | A | * | 11/1988 | Gopfert | B66C 23/54 |
| | | | | | 414/737 |
| 6,149,375 | A | * | 11/2000 | Hebrank | A01K 45/007 |
| | | | | | 414/404 |
| 2005/0095106 | A1 | * | 5/2005 | Pearce | B66F 9/122 |
| | | | | | 414/627 |
| 2007/0189888 | A1 | * | 8/2007 | Tanner | B66F 9/061 |
| | | | | | 414/672 |
| 2009/0314691 | A1 | * | 12/2009 | Hebrank | A01K 43/00 |
| | | | | | 209/511 |
| 2011/0264306 | A1 | * | 10/2011 | Bagge | B66F 9/181 |
| | | | | | 414/560 |
| 2015/0071741 | A1 | * | 3/2015 | Schnupper | A23L 15/00 |
| | | | | | 414/225.01 |
| 2015/0096497 | A1 | * | 4/2015 | Schnupper | F04B 43/1284 |
| | | | | | 119/6.8 |
| 2016/0227744 | A1 | * | 8/2016 | Rees | A01K 45/007 |

* cited by examiner

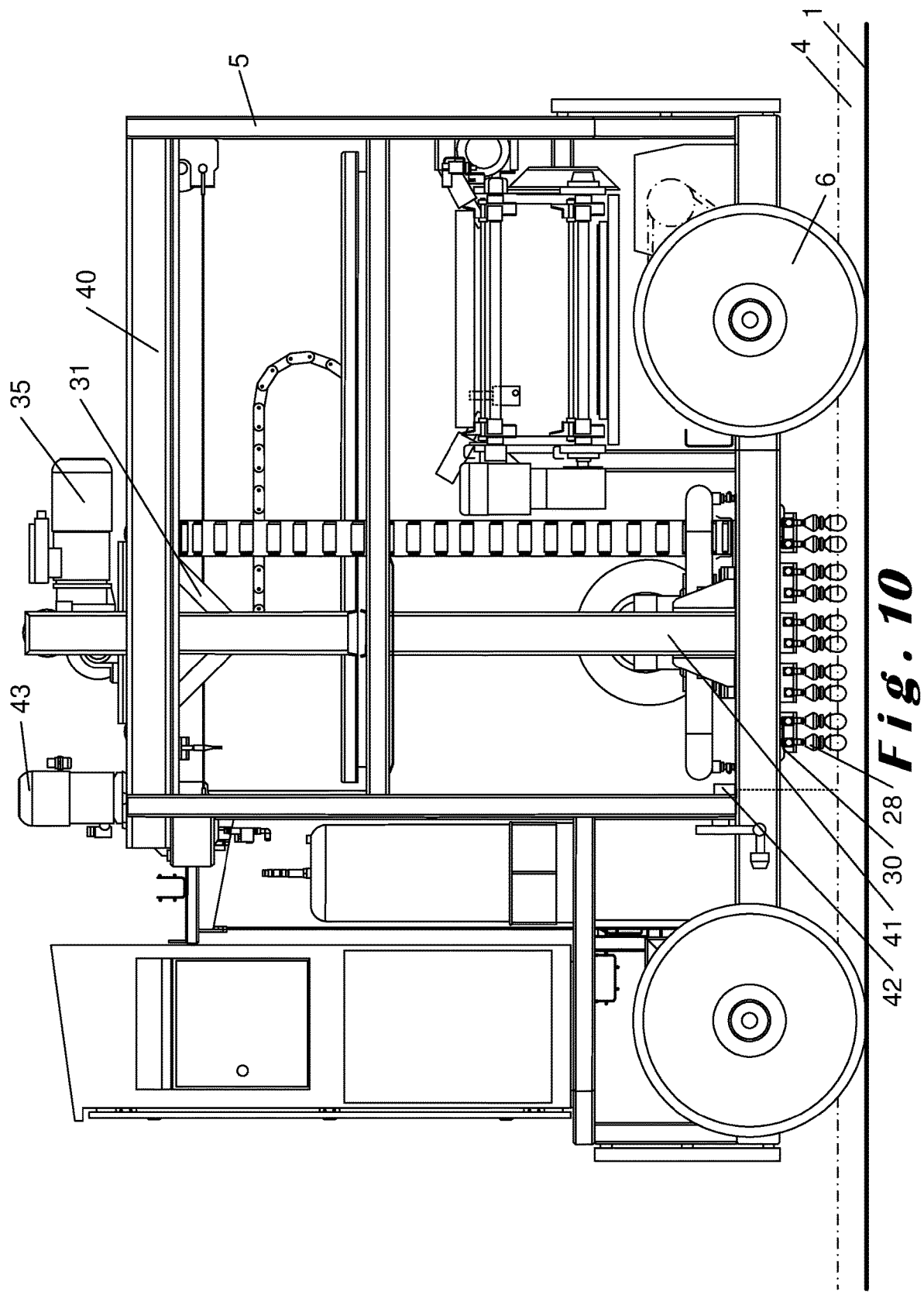

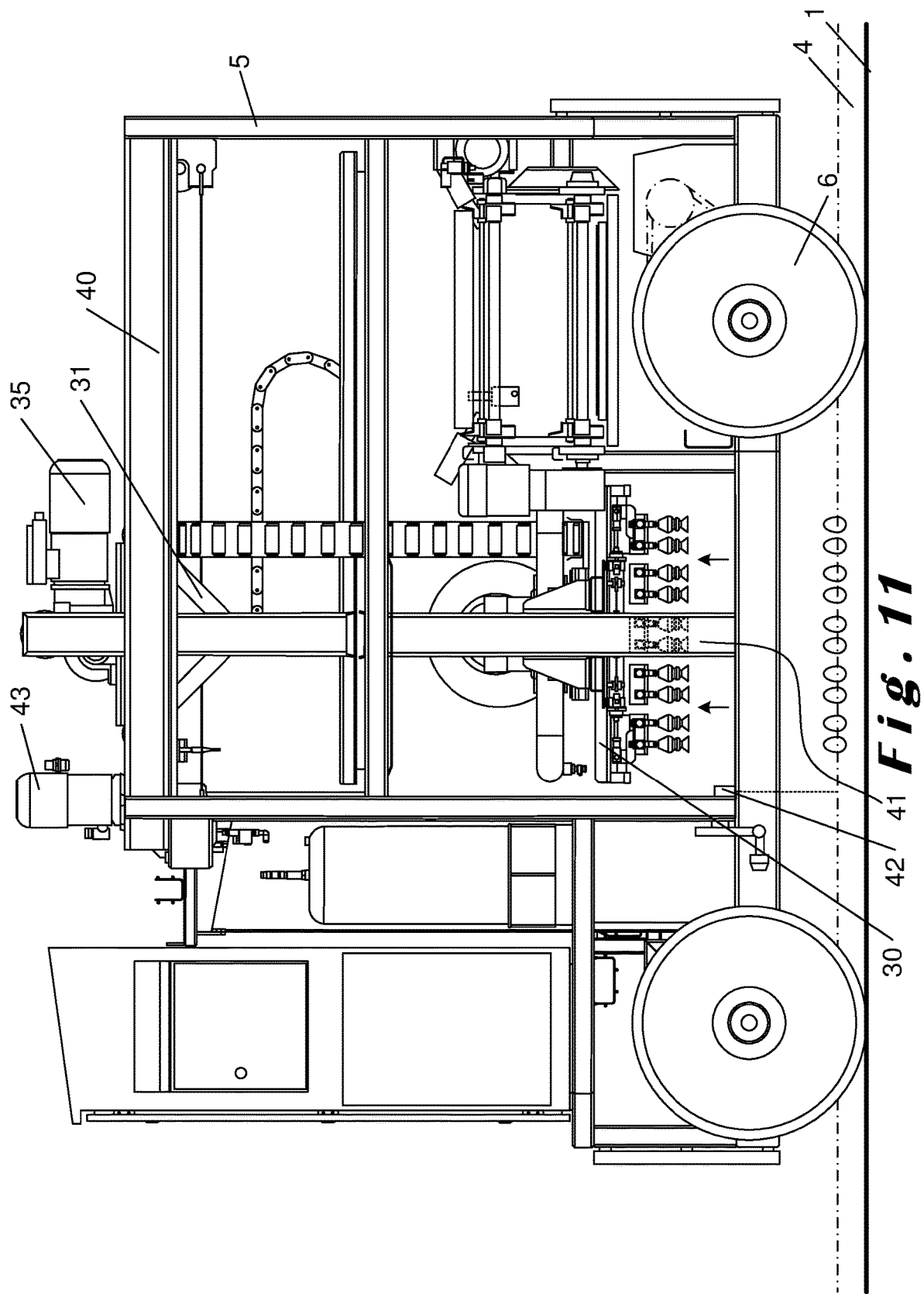

TRANSFER MACHINE AND USE THEREOF IN A POULTRY HOUSE FOR TRANSFERRING INCUBATED EGGS TO A FLOOR THEREOF

The present invention relates to a transfer machine for transferring, in a poultry house, incubated eggs from trays filled with the incubated eggs to a floor of said poultry house.

The prior art already discloses a transfer machine that exhibits the features indicated in the preamble of the first claim. This transfer machine comprises a frame that rests on a transport system to drive over the floor of the poultry house, an input and output system for inserting the trays filled with the incubated eggs into the transfer machine and for removing the emptied trays therefrom again and a transfer system for transferring the eggs from the trays that have been inserted into the transfer machine to the floor of the poultry house. The transfer system itself comprises a set of egg pickup members mounted on a first sub-frame which is mounted at least up and down movably on said frame for removing the eggs from the trays at the top of the machine and for placing them at the bottom of the machine on the floor of the poultry house.

Such a machine is already known from BE1024985. In this known transfer machine, the transfer system is formed by a set of egg pickup members, more specifically suction cups, that are provided on a sub-frame. This sub-frame is directly mounted via a vertical guide up and downward movably on the frame of the machine. The input and output system of the trays filled with the incubated eggs not only feeds the filled trays into the machine, but also moves back and forth in the machine to bring the filled trays into and out of the vertical path of the transfer system. This means that the transfer system only has to move up and down. The advantage of this is that the incubated eggs, which have a brittle shell, can be carefully transferred to the floor of the poultry house to avoid damaging the eggs. It was in fact already known that the hatching rate of the eggs decreases considerably when the eggs are not transferred carefully enough. More specifically, hairline cracks in the shell can appear when the eggs are not transferred carefully, and the hatching rate of eggs with hairline cracks is about 15% lower than the hatching rate of eggs without hairline cracks.

BE 1023719, which was described as closest prior art in BE 1024985, previously disclosed a transfer machine wherein a robot arm was used to extract the eggs from the trays and transfer them to the floor of the poultry house. The advantage of such a machine is that the operator (or operators) can continuously place full trays on the machine and remove the empty trays therefrom. In this manner, a maximum transfer capacity can thus be achieved. However, as described in BE 1024985, the use of a robot arm has the disadvantage that due to the swinging movements thereof, the eggs cannot be placed on the floor of the poultry house carefully enough, such that the formation of hairline cracks or other damage is very likely.

In NL 2004696, the problem of damaging the incubated eggs during the transfer is also addressed. The transfer of the eggs is also carried out by means of a robot arm in this case. However, the eggs are not laid on the ground but in containers to allow the eggs to hatch further. To prevent damage to the eggs, a vertical airflow is created through the bottom of these containers. Such a vertical airflow can of course not be created across the floor of the poultry house, or at least not without considerable investment.

As indicated above, the transfer machine according to BE 1024985 does not use a robot arm in order to avoid damaging the incubated eggs, but the movement of the transfer system is limited to a mere up-and-down movement. In this case, the trays filled with eggs therefore have to be placed by the input and output system under the egg pickup members when the latter are in their uppermost position. Next, the egg pickup members have to pick up the eggs from the trays. The emptied trays then have to be removed under the egg pickup members. Only then can the egg pickup members be moved down to under the machine in order to place the eggs on the floor of the poultry house.

The disadvantage of such a machine is that the cycle time is relatively long. The transfer capacity of the machine is thus relatively limited, despite the fact that during each cycle of the machine used, two trays with 150 eggs each are transferred from the trays to the floor of the poultry house at the same time. A further disadvantage of this known machine is that the operator (or operators) cannot place any trays on or remove any trays from the input and output system when the input and output system moves to its position under the egg pickup members and when the egg pickup members pick up the eggs from the trays. A final disadvantage is that, for safety reasons, the transfer machine cannot be shielded without reducing the transfer capacity. In fact, the operator (or operators) would in this case even have to wait for the return of the input and output system before being able to remove the emptied trays therefrom.

An object of the present invention is therefore to provide a new transfer machine that enables a shorter cycle time.

To this end, the transfer machine according to the invention is characterised
- in that said first sub-frame is mounted up and down movably on a second sub-frame,
- in that said second sub-frame is mounted back and forth movably on said frame between a first position, wherein the set of egg pickup members is above the filled trays that have been inserted, and a second position, wherein the set of egg pickup members is situated above the floor of the poultry house and can move up and down between said uppermost and lowermost positions, and
- in that at least one guide is provided on said second sub-frame for guiding said first sub-frame up and down along this guide.

According to the invention, it was found that the cycle time could be considerably shortened by providing the second sub-frame, which can move back and forth on the frame, between the frame and the first sub-frame. In the transfer machine known from BE 1024985, the egg pickup members, in their uppermost position, first have to wait for a time until the filled trays are placed under the egg pickup members before they can pick the eggs therefrom. The egg pickup members then have to wait for another time until the filled trays have been removed from underneath the egg pickup members before they can lay the eggs on the floor of the poultry house. These two waiting times constitute a significant part of the cycle time, which in practice is more specifically approximately 25 to 30%. According to the invention, it was found that the cycle time could be considerably shortened by allowing the egg pickup members to not only move up and down, but also back and forth on the frame, as a result of which the trays themselves no longer have to be moved back and forth on the frame. Because the eggs are held by the egg pickup members, it has proven possible to allow these egg pickup members to move back and forth faster than the trays containing the loose eggs without damaging the eggs in the process. In the known transfer machine, it is also not possible to allow the input and output system to move back and forth as quickly because of its weight and the fact that the input and output system has to position the filled trays accurately under the egg pickup members.

A further advantage of the transfer machine according to the invention is that the operator (or operators) loses less time waiting for the input and output system to return before being able to place again filled trays thereon. This also allows the operator(s) to cope with a higher transfer capacity.

In an embodiment of the transfer machine according to the invention, at least one further guide is provided on said frame, which further guide, in said second position of said second sub-frame, connects to said guide thereof to further guide said first sub-frame up and down into a lowermost position of said first sub-frame, wherein said egg pickup members are in their lowermost position above said floor.

In this embodiment, the second frame can be kept compact because the guide to be provided thereon does not have to extend to the bottom of the machine. It is also possible to provide the guide of the second frame at both ends since, because of the limited height thereof, they cannot interfere with the input and output system of the trays, in particular because they are at a higher level.

In this embodiment, said guide preferably comprises a first and a second guide, and said further guide comprises a third and a fourth guide, wherein said third guide, in said second position of said second sub-frame, connects to said first guide thereof, and said fourth guide connects to said second guide. Furthermore, said third and fourth guide are more preferably on opposite sides of the transfer machine.

By providing two guides in each case, the second sub-frame can be suspended and guided stably in a simple manner, without the need for heavy structures. The guides can indeed be placed centrally in relation to the second frame in such a way that the second frame is suspended substantially in equilibrium.

Preferably, said first, second, third and fourth guides each comprise a rail which preferably extends substantially vertically, wherein said first sub-frame is preferably provided with wheels to move up and down along the rails.

In this manner, stable suspension of the first sub-frame and of the egg pickup members mounted thereon in the machine can easily be obtained.

In an embodiment of the transfer machine according to the invention, at least one guide is provided on said frame for guiding said second sub-frame back and forth along this guide, preferably substantially horizontally.

In this manner, stable suspension of the second sub-frame with the first sub-frame mounted thereon in the machine can easily be obtained.

In an embodiment of the transfer machine according to the invention, said input and output system comprises a first transport mechanism which is configured to move the trays filled with the incubated eggs in a first direction to insert these trays into the transfer machine and which is further configured to move the emptied trays also in said first direction to remove these trays from the first transport mechanism.

An advantage of this embodiment is that as soon as the transfer system has picked the eggs from the trays, the operator (or operators) can immediately place new filled trays on the first transport mechanism since the emptied trays leave this first transport mechanism via the other side. In this manner, the transfer capacity can be further increased.

Preferably, said first transport mechanism is configured to position two trays filled with the incubated eggs under said egg pickup members and said transfer system is configured to empty these two trays simultaneously.

Because each time the eggs of two trays are transferred simultaneously, the transfer capacity is twice as high as it would be if only the eggs from one tray were transferred each time. The stability of the guides makes it possible to place this relatively large number of eggs, which occupy a relatively large surface area, with sufficient care on the floor of the poultry house.

Preferably, said input and output system further comprises a second transport mechanism which extends under said first transport mechanism, and a turning system for receiving the emptied trays that have been removed from the first transport mechanism and for conveying these emptied trays to the second transport mechanism.

The emptied trays are thus immediately transferred to the second transport mechanism in such a way that the operator(s) does not have to take them immediately but can continue to continuously place filled trays on the first transport mechanism and to remove emptied trays from the second transport mechanism. The turning system also allows the transfer machine to be kept compact, and the trays can be inserted into the same side of the machine and removed again therefrom. Also, the emptied trays cannot fall out of the transfer machine on the other side and onto the ground. Because of the possible risk of contamination, this must indeed be avoided.

Preferably, said turning system is configured to receive the emptied trays one by one and to convey them one by one to the second transport mechanism.

As a result, this turning system can also be kept compact. More specifically, the first transport mechanism and the turning system can be positioned one after the other in the transverse direction of the transfer machine, i.e. transverse to the driving direction of the transfer machine, without the transfer machine becoming too wide.

Preferably, said turning system comprises a third transport mechanism which is mounted in a tilting manner between a first and a second tilting position on said frame, wherein, in the first tilting position, the third transport mechanism extends in the extension of said first transport mechanism to receive the emptied trays and wherein, in the second tilting position, the third transport mechanism is tilted obliquely towards the second transport mechanism to convey the emptied trays which have been received by the third transport mechanism to the second transport mechanism.

Such a tilting mechanism can be easily implemented and allows the trays to be transferred reliably and quickly from the first transport mechanism to the second transport mechanism located just below it.

Preferably, said second transport mechanism is configured to move the emptied trays in a second direction, which is opposite to said first direction, wherein the transfer machine has, on one side, an insertion opening for inserting the trays filled with the incubated eggs into the transfer machine and, on the same side, a removal opening for removing the emptied trays from the transfer machine.

The operator (or operators) can thus insert the filled trays into the transfer machine on the same side of the transfer machine and remove the empty trays on that side again in a simple manner. The transfer capacity can thus be raised because one has to operate only on one side of the machine. Anyway, because of the presence of the strip of eggs on the floor of the barn, it is difficult to move from one side of the machine to the other. Despite the warm conditions in the poultry house, in which the temperature has to be sufficiently high to allow the incubated eggs to hatch further, it is possible to fill it in one go with several tens of thousands of eggs without having to take a rest.

In an embodiment of the transfer machine according to the invention, this machine comprises a motor to drive the transport system for driving the transfer machine through the poultry house.

The machine can therefore drive independently through the barn, as well as in and out of it. Because of the low speed at which the machine drives through the barn when transferring the eggs, with the machine preferably stopping each time the eggs are laid on the floor, the machine does not have to be continuously steered, such that the operator himself/herself can also ensure that the transfer machine drives through the barn correctly. The transfer machine can also be provided with an automatic steering and driving device, such that the latter automatically maintains the correct driving direction and preferably stops when there are obstructions.

The invention also relates to the use of the transfer machine according to the invention for transferring incubated eggs from trays filled with incubated eggs to the floor of a poultry house.

Further particularities and advantages of the invention will become apparent from the following description of a particular embodiment of the transfer machine according to the invention. This description is only given as an example and is not intended to limit the scope of protection as determined by the claims. The reference numerals given in the description relate to the accompanying drawings, wherein:

FIG. 1 schematically shows a perspective view of an embodiment of a transfer machine according to the invention, with a number of parts omitted, including the side walls and the rear wall of the machine;

FIG. 10 is the same view as FIG. 9, but the egg pickup members with the eggs picked up therewith have been moved to the underside of the machine and the eggs are placed in the litter on the floor of the poultry house; and FIG. 11 is the same view as FIG. 10, but the egg pickup members have placed the eggs on the floor and are moving again to the upper side of the machine.

Figure 1:
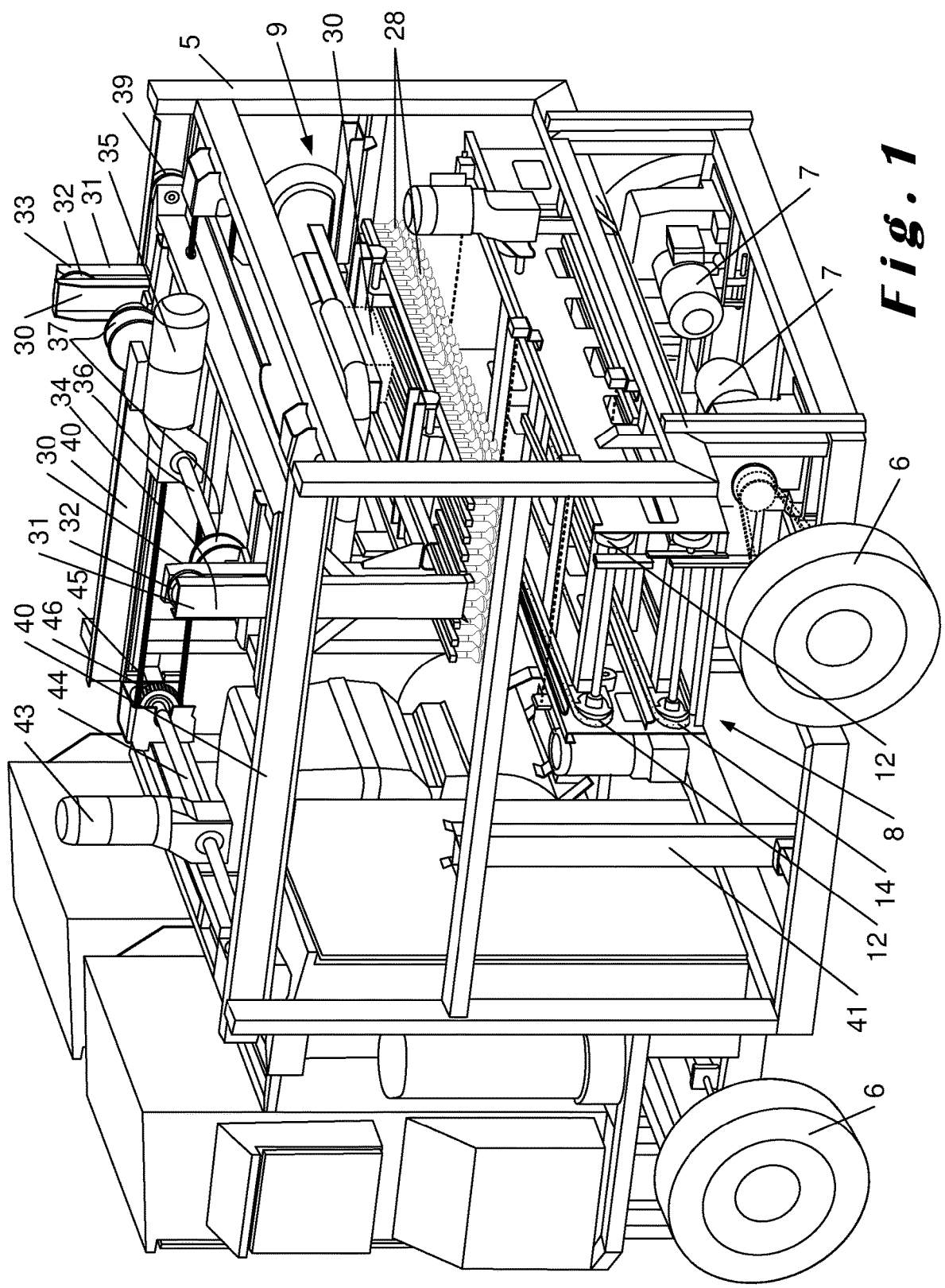

The invention generally relates to a transfer machine for transferring, in a poultry house, incubated eggs 2 from trays 3 filled with the incubated eggs to a floor 1 of said poultry house. The eggs 2 can be of different types of poultry, in particular chickens. The floor 1 is covered with a layer of litter 4 at least on the space/strip where the eggs 2 are laid in order to prevent damage to the eggs during placement and, where necessary, to provide a degree of insulation for the eggs.

The figures schematically show a possible embodiment of the machine according to the invention, in different positions and with a number of parts omitted.

The machine shown in the figures comprises a frame 5 that rests on a transport system in order to drive over the floor 1 of the poultry house. The transport system comprises a number of wheels 6, of which the two rear ones are each driven by an electric motor 7. The machine can be steered with the two front wheels.

An input and output system 8 is mounted on the frame 5 of the machine for inserting the trays 3 filled with the incubated eggs 2 into the transfer machine and for removing the emptied trays 3 therefrom again. Furthermore, a transfer system 9 is mounted on the frame 5 of the machine for transferring the eggs from the trays 3 inserted into the transfer machine to the floor 1 of the poultry house.

Figure 2:
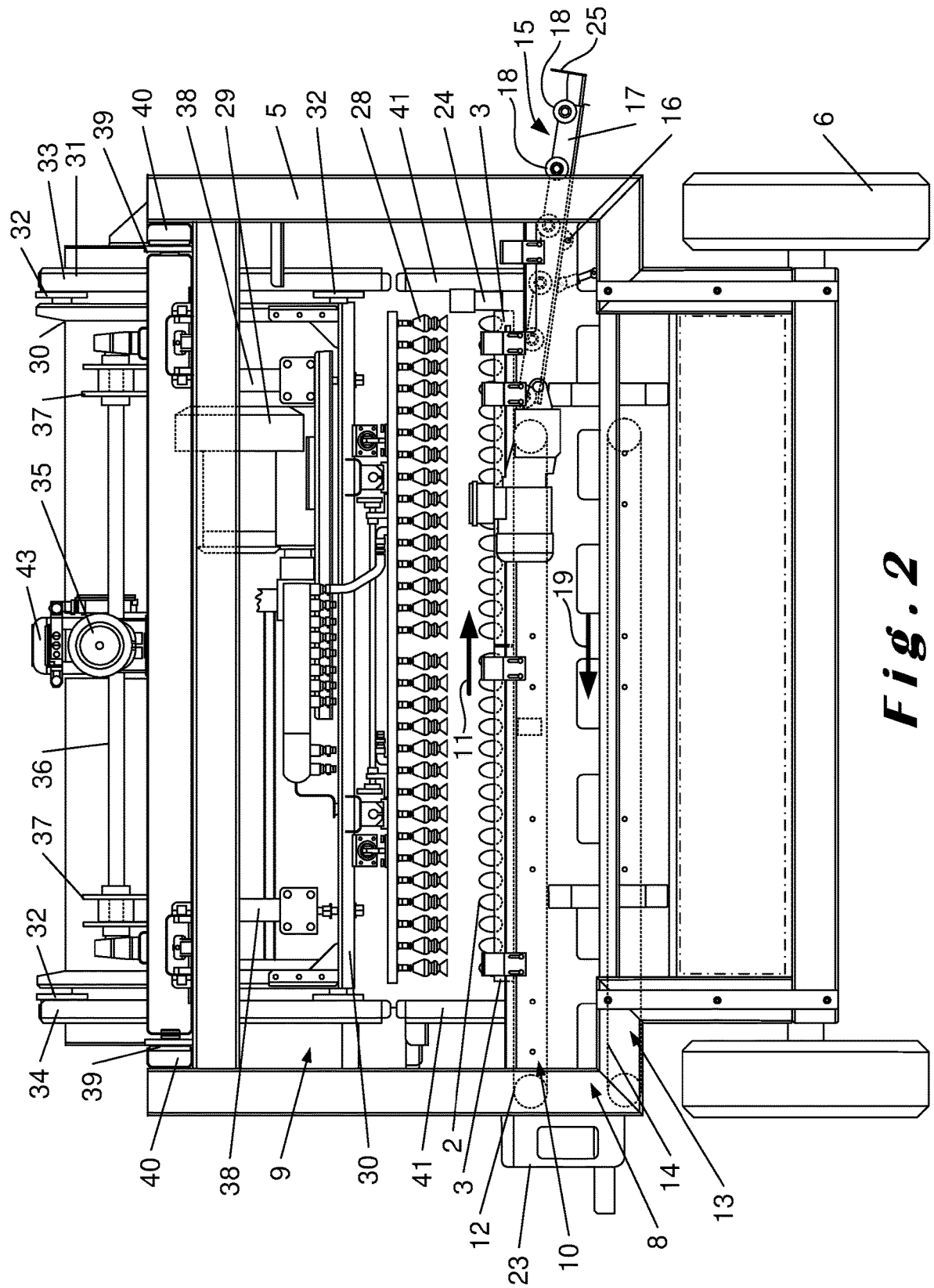
FIG. 2 shows a rear view of the most important parts of the machine according to FIG. 1, with the egg pickup members located above the trays filled with eggs.

The input and output system 8 comprises a first transport mechanism 10, with a first transport belt, which is configured to move the trays 3 filled with the incubated eggs in a first direction, shown by arrow 11 in FIG. 2, to feed these trays 3 into the transfer machine and which is further configured to move the emptied trays 3 also in said first direction, shown by arrow 11, to remove these trays 3 from the first transport mechanism 10. The first transport belt is formed by two endless belts 12, which support the trays 3 under their longitudinal edges.

The input and output system 8 further comprises a second transport mechanism 13, with a second transport belt, which extends under the first transport mechanism 10, the second transport belt being once again formed by two endless belts 14, which support the trays 3 under their longitudinal edges, and a turning system 15 for receiving the emptied trays 3 that have been removed from the first transport mechanism 10 and for conveying these emptied trays to the second transport mechanism 13. The turning system 15 being configured to receive the emptied trays 3 one by one and to convey them one by one to the second transport mechanism 13.

The turning system 15 is formed by a third transport mechanism 15 that is mounted on the frame 5 so as to tilt about an axis 16 between a first and a second tilting position. In the first tilting position, shown in FIGS. 2 to 4, the third transport mechanism 15 extends in the extension of said first transport mechanism 10 to receive the emptied trays 3. In the second tilting position, shown in FIG. 5, the third transport mechanism 15 is tilted obliquely towards the second transport mechanism 13 to convey the emptied trays 3 that have been received by the third transport mechanism to the second transport mechanism 13.

The third transport mechanism 13 comprises a framework 17 on which wheels 18 are provided on two opposite sides, over which wheels the trays 3 can roll with their longitudinal edges. In the first tilting position, the framework 17 slopes down to the outside of the transfer machine so that the tray 3 located on this framework 17 rolls under the influence of gravity to the outside of the machine. In the second tilting position, the framework 17 slopes down to the inside of the transfer machine in such a way that the tray 3 located on this framework 17 rolls under the influence of gravity back to the inside of the machine, more specifically to the transport belt of the second transport mechanism 13. This second transport mechanism 13 then transports the tray 3 back, as shown by arrow 19 in FIG. 2, to the other side of the transfer machine.

The second transport mechanism 13 is in fact configured to move the emptied trays 3 in a second direction, indicated by arrow 19, which is opposite to the first direction, indicated by arrow 11. The transfer machine has, on one side, namely on the left side as viewed in FIGS. 2 to 5, a feed opening 21 for inserting the trays 3 filled with the incubated eggs into the transfer machine. The feed opening 21 leads out, more particularly, onto the transport belt of the first transport mechanism 10 so that the full trays 3 can easily be placed manually thereon. On the same side, i.e. likewise on the left side, the transfer machine has a removal opening 22 for removing the emptied trays 3 from the transfer machine. This removal opening 22 is located under the feed opening 21, at the level of the second transport mechanism 13, in such a way that the emptied trays 3 are automatically transported to the removal opening 22 by the second transport mechanism 13. The trays 3 protrude preferably over a short distance from the transfer machine in such a way that they can be easily picked up and removed. At the feed opening 21 and the removal opening 22, a detachable attachment 23 is preferably fitted to the side of the transfer machine. This attachment provides, on the one hand, additional guidance to facilitate the insertion of the full trays 3 and, on the other hand, provides additional support for the trays 3 coming out of the transfer machine so that they can protrude further out of the machine and can therefore be removed more easily and quickly.

The attachment 23 offers the advantage that the machine can be made narrower. On the other side of the machine, the framework 17 of the turning mechanism 15 can also be partially retracted and extended, with the turning mechanism protruding out of the side of the machine in the extended position shown in FIGS. 2 to 5. This retractable turning mechanism 15 thus also allows the machine to be made narrower.

The operation of the input and output system 8 becomes clearly apparent from the successive positions shown in FIGS. 2 to 5.

In FIG. 2, two full trays 3 have been inserted into the machine by the first transport system 10 in the direction of the arrow 11. The first tray 3 is stopped in this case by a pneumatically operated stop 24 while the second tray 3 strikes the first. Both belts 12 of the first transport system 10 have a smooth upper side such that they can continue to rotate under the trays 3 when the trays 3 are stopped.

Figure 3:
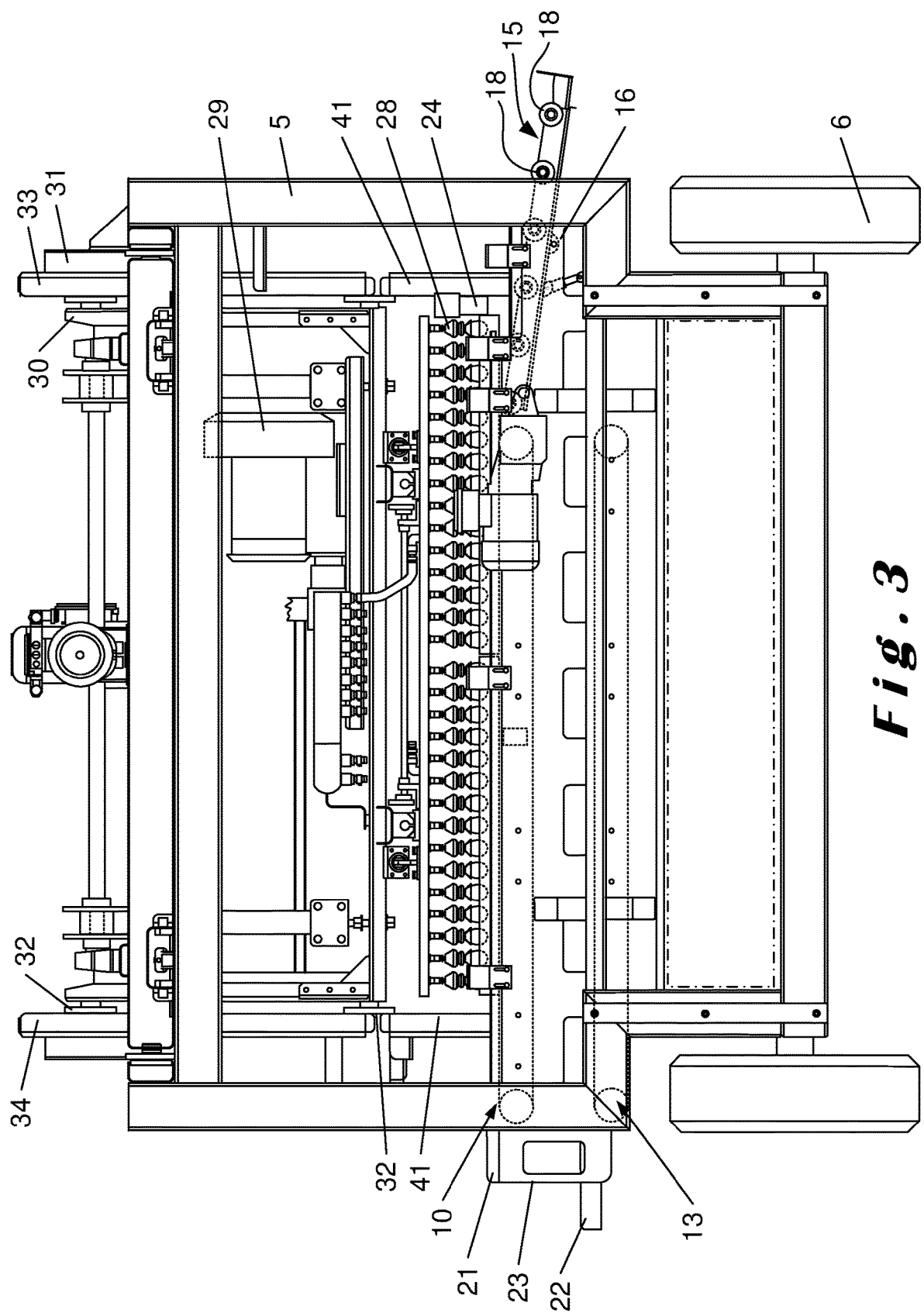
FIG. 3 is the same view as FIG. 2, but the egg pickup members are lowered onto the eggs and pick them up by suction.
Figure 4:
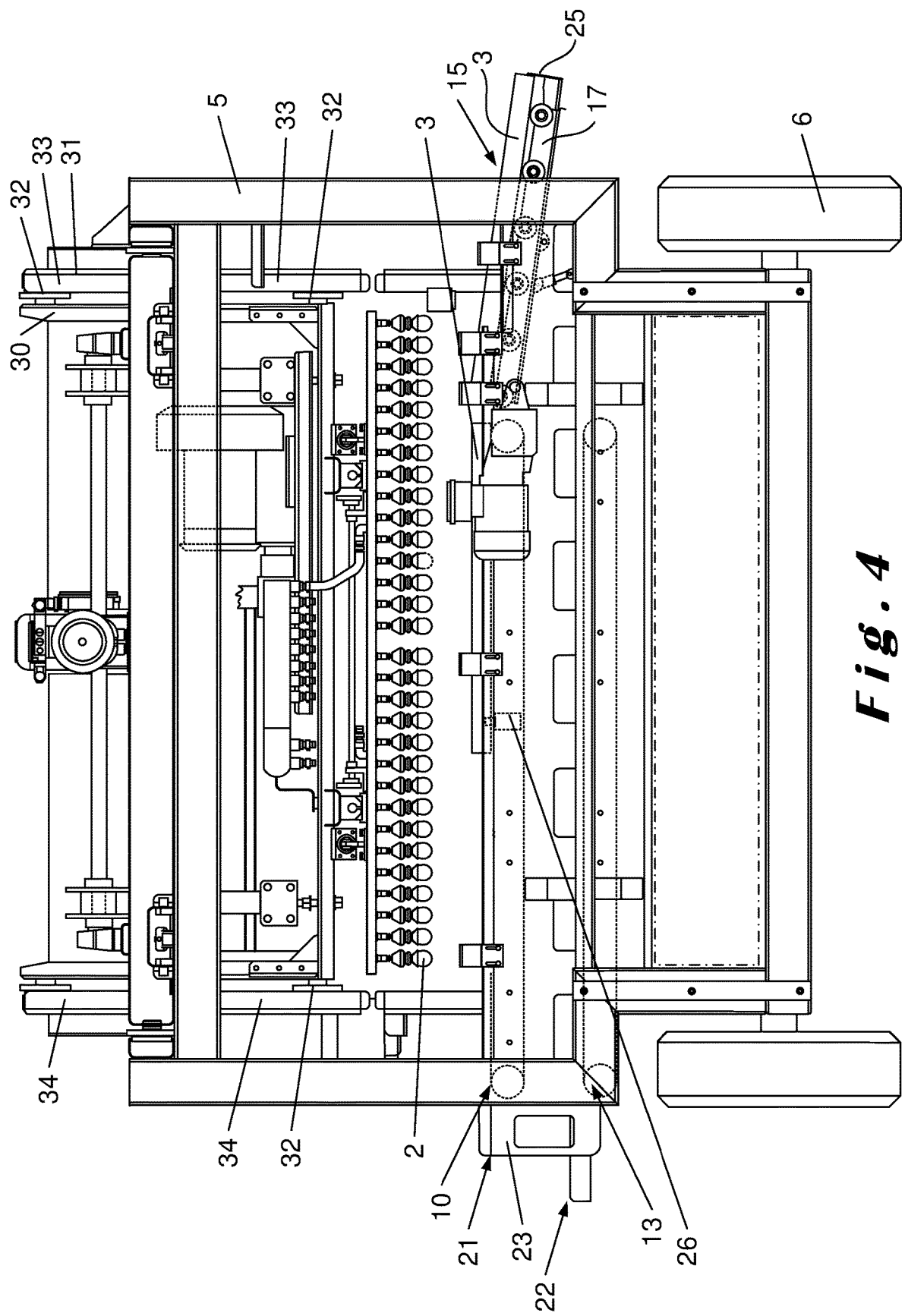
FIG. 4 is the same view as FIG. 3, but the egg pickup members including the eggs picked up therewith are displaced upwards and the emptied trays are discharged laterally.
Figure 5:
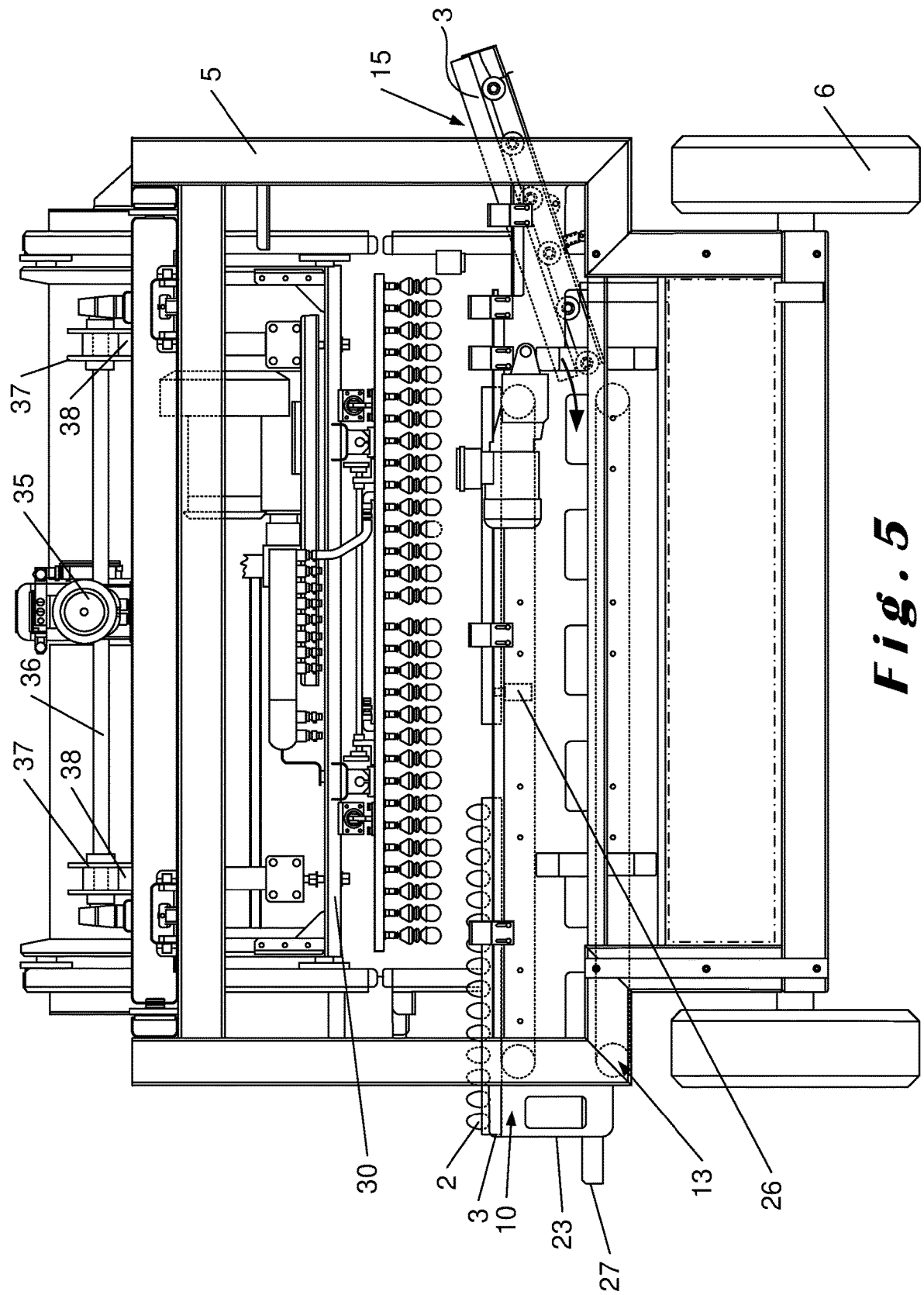
FIG. 5 is the same view as FIG. 4, but the emptied trays are discharged further and a new full tray is inserted into the machine.

In FIG. 3, the eggs 2 are picked from the trays 3 by means of the transfer system 9, after which the emptied trays 3, as shown in FIG. 4, are transferred by the first transport mechanism 10, via the turning system 15, to the second transport mechanism 13. For this purpose, the stop 24 is retracted so that both trays 3 are further transported by the first transport mechanism 10. When the first tray 3 arrives on the turning system 15 sloping down to the outside, it automatically continues to roll outside until it reaches a fixed stop 25. The second tray 3 is stopped in time by a stop 26, which is extended from bottom to top, in such a way that this second tray 3 does not impede the turning of the first tray, as indicated in FIG. 5. The tilting of the turning system 15 causes the first tray to automatically roll onto the second transport mechanism 15, which transports the first tray to the other side of the machine, more specifically to the removal opening 22. The first tray is stopped by a fixed stop 27 in the attachment 23, and the belts 14 of the second transport mechanism 13 again have a smooth upper side such that they can continue to rotate in order to convey a second tray from the turning mechanism 15 onto the second transport mechanism 13. Two trays can thus be stored on the second transport mechanism 13 before they have to be removed by the operator. Because the trays are automatically conveyed from the first 10 to the second transport mechanism 13, an operator himself/herself can already place new full trays on the first transport system 10 during this conveying. When the transfer system 9 removes the eggs from the trays, the operator can remove the empty trays from the second transport mechanism 13. This allows the operator to work continuously, allowing him/her to achieve a maximum transfer capacity.

The transfer system 9 itself comprises a set of egg pickup members 28 which are preferably formed by suction cups which can suck in the eggs by means of a vacuum created by a vacuum pump 29. When the eggs are sucked in, the suction cups are preferably drawn together in such a way that, when the eggs are transferred to the litter 4, they can expand again to press the eggs into the litter 4.

The egg pickup members 28 are mounted on a first sub-frame 30, which is mounted on a second sub-frame 31 such that it can be moved up and down. For this purpose, the first sub-frame 30 is provided at both ends with two wheels 32 respectively located in a first 33 and in a second guide 34 provided on the second sub-frame 31. The first 33 and the second guide 34 are preferably formed by a U-shaped rail. The first 33 and the second guide 34 are sufficiently long for the egg pickup members 28 to be lowered by means of the first sub-frame 30 onto the eggs in the trays on the first transport mechanism 10. The up-and-down movement of the first sub-frame 30 is carried out by means of an electric motor 35 which drives an axle 36 with pulleys 37 supported on the second sub-frame. The belts 38, which are rolled up and down on these pulleys 37 by rotation of the axle 36, are fastened to the sub-frame 30 in order to raise and lower the latter.

In turn, the second sub-frame 31 is also provided at both ends with two wheels 39. These wheels 39 are each located in a guide 40 which is provided on one side of the transfer machine. Via the guides 40, which are formed in particular by substantially horizontal rails, the second sub-frame 31 can move back and forth on the frame 5 in the machine, more specifically between a first position, shown in FIGS. 1 and 6 to 8, in which the set of egg pickup members 28 are located above the first transport mechanism 10, and a second position, shown in FIGS. 9 to 11, in which the set of egg pickup members 28 are located above the floor 1 of the poultry house and can move up and down between a bottom position, just above the floor as shown in FIG. 10, and a top position, shown in FIG. 9. In order to move the second sub-frame 31 back and forth, an electric motor 43 is provided on the frame 5 and drives an axle 44 supported on the frame 5. On the axle 44, two toothed pulleys are provided for an endless belt 45 which extends horizontally between the toothed pulley and a pulley 46 at the rear of the machine. The second sub-frame 31 is fastened to one side of the belt 45 in such a way that it can be pulled back and forth by means of the electric motor 43.

Both in the first position and in the second position of the second sub-frame 31, the vertical belts 38, which can be rolled up and down by the electric motor 35, ensure that the first sub-frame 30, on which the egg pickup members 28 are mounted, can be moved up and down. In the second position of the second sub-frame 31, the first sub-frame 30 can be moved over a relatively large distance, namely from its uppermost position to its lowermost position. This large displacement could be achieved by making the first 33 and second guide 34 provided on the second sub-frame 31 sufficiently long, but these rails would then have to be provided to the side of the input and output system 8 so as not to interfere with the operation thereof. In the transfer machine as shown in the figures, the large vertical displacement of the first sub-frame 30 is made possible by providing further guides 41 on the frame 5 which, like the first 33 and the second guide 34, are formed by vertical rails. In the second position of the second sub-frame 31, shown in FIGS. 9 to 11, these further guides 41, which are provided on the frame 5, connect to the first 33 and the second guide 34, which are provided on the second sub-frame 31, in order to further guide the first sub-frame 30 up and down into its bottom position, in which the egg pickup members 28 are in their bottom position above the floor.

As shown in FIG. 10, when the vacuum is removed from the egg pickup members 28, the eggs are slightly pressed by these egg pickup members 28 into the litter 4, as a result of which the eggs remain largely upright. A sensor 42 is preferably provided on the machine and is used to measure the level of the litter bed. Depending on this level, the level to which the egg pickup members 28 have to be lowered is then determined in order to be able to press the eggs optimally into the litter 4.

The operation of the transfer system 9 is clearly shown by the successive positions shown in FIGS. 6 to 11.

Figure 6:
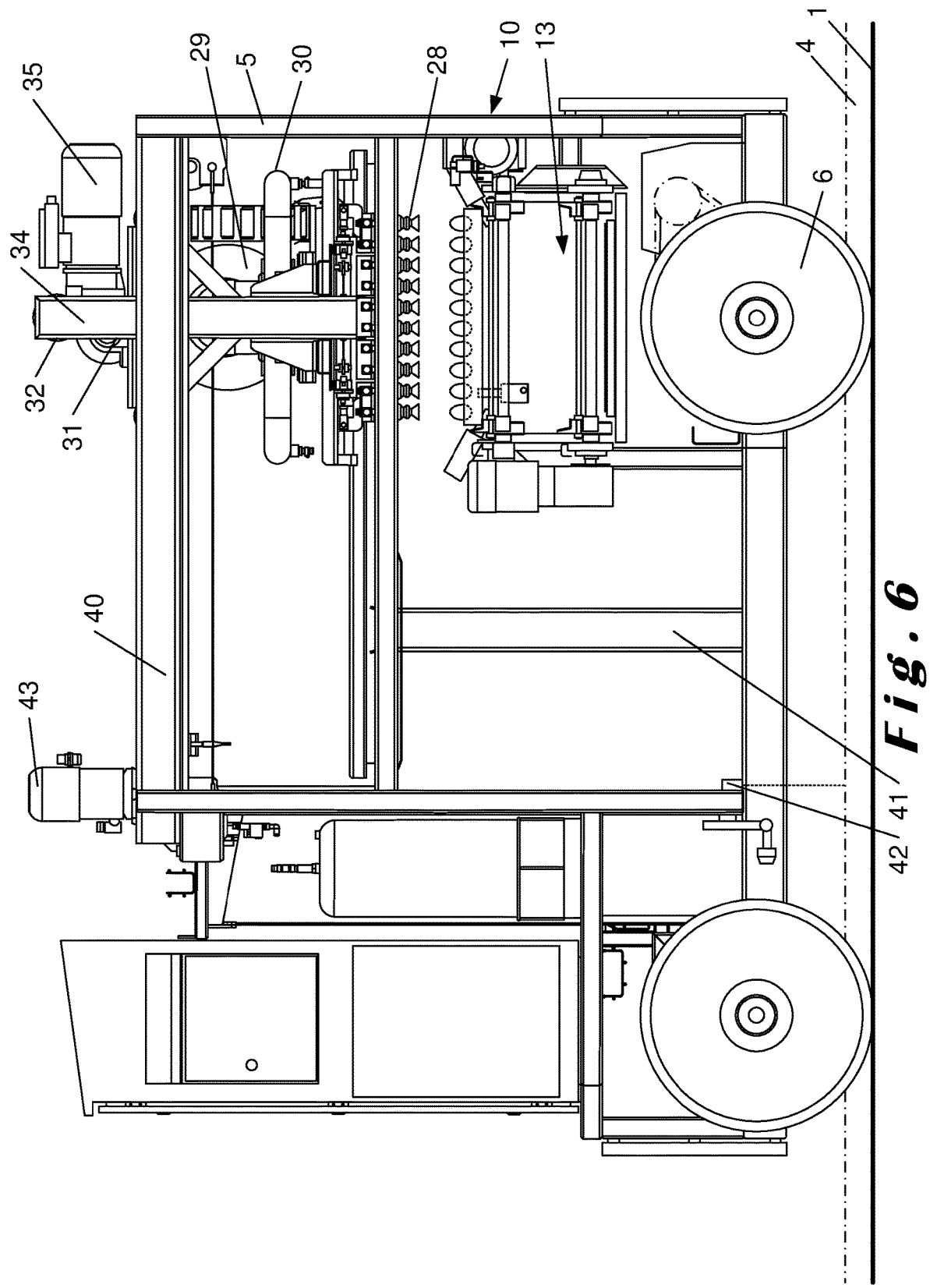
FIG. 6 shows a side view of the most important parts of the machine according to FIG. 1, with the egg pickup members located above the trays filled with eggs.

In FIG. 6, the second sub-frame 31 is in its first position, and the first sub-frame 30 in its uppermost position, above the first transport mechanism 10 with the trays 3 filled with eggs 2 thereon.

Figure 7:
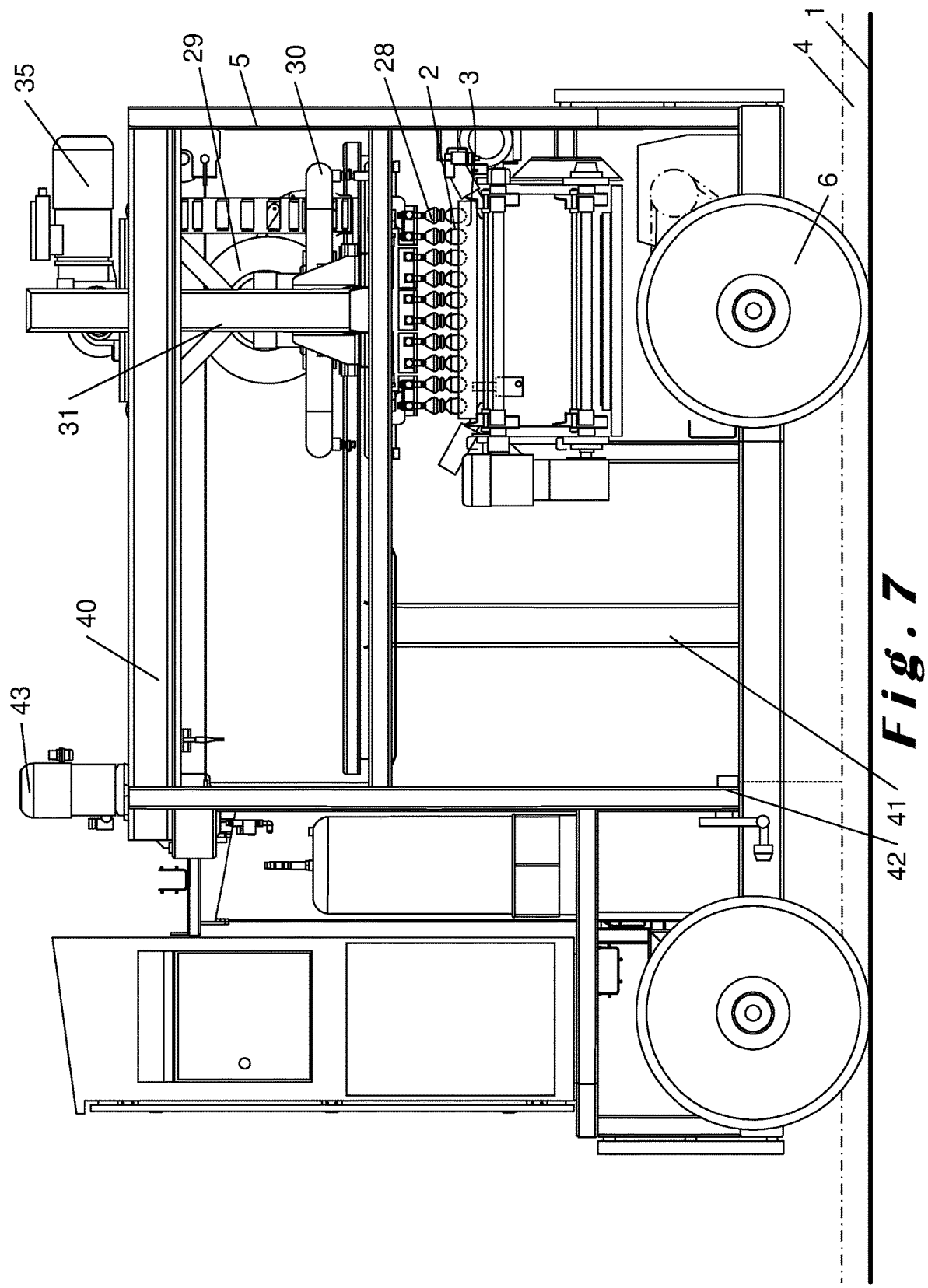
FIG. 7 is the same view as FIG. 6, but the egg pickup members are lowered onto the eggs and pick them up by suction.

In FIG. 7, the first sub-frame 30 has been lowered above the eggs by means of the electric motor 35 and the eggs 2 have been sucked in by means of the egg pickup members 28.

Figure 8:
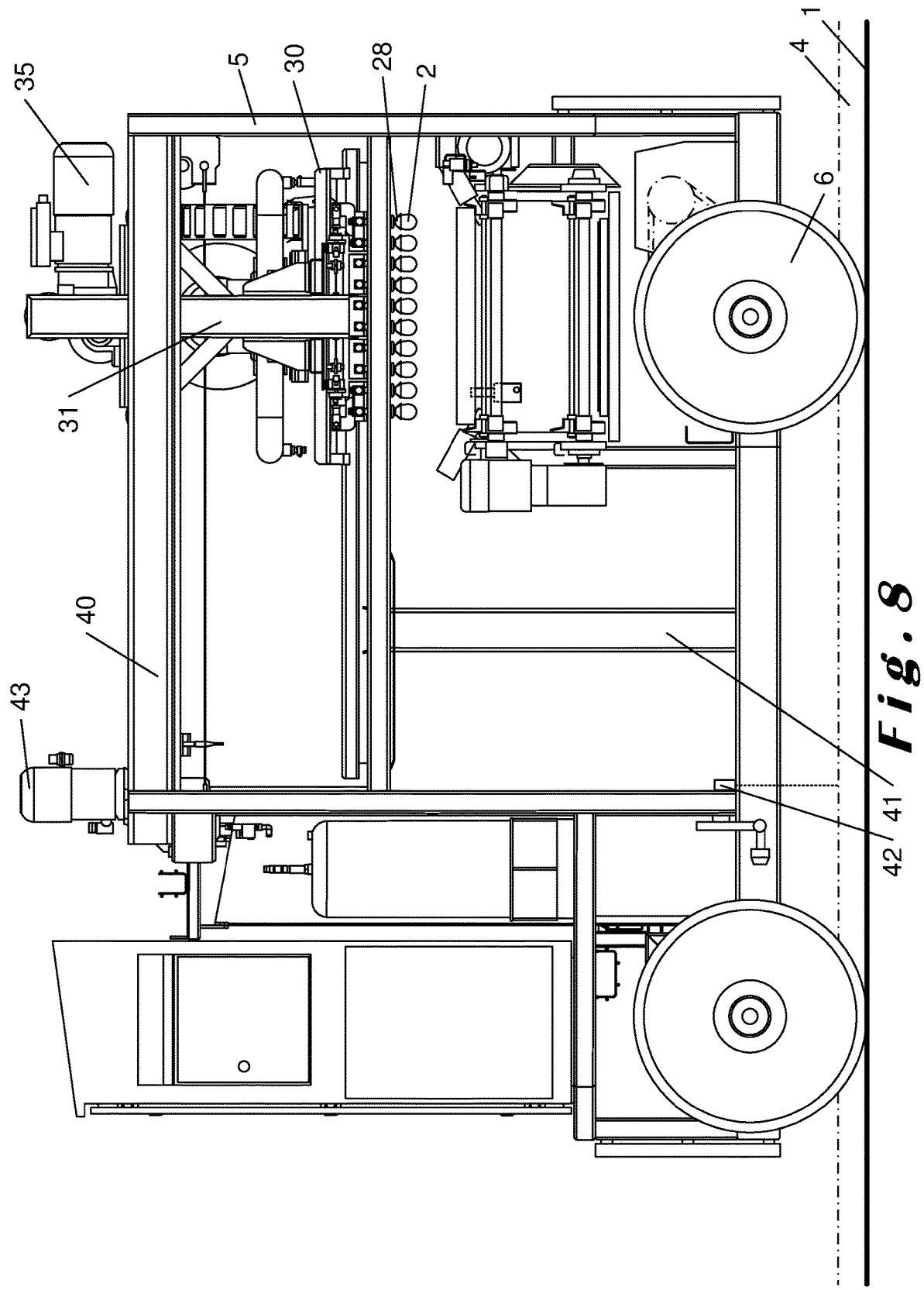
FIG. 8 is the same view as FIG. 7, but the egg pickup members including the eggs picked up therewith have been moved upwards.

In FIG. 8, the first sub-frame 30 has been pulled back up to its uppermost position by means of the electric motor 35.

Figure 9:
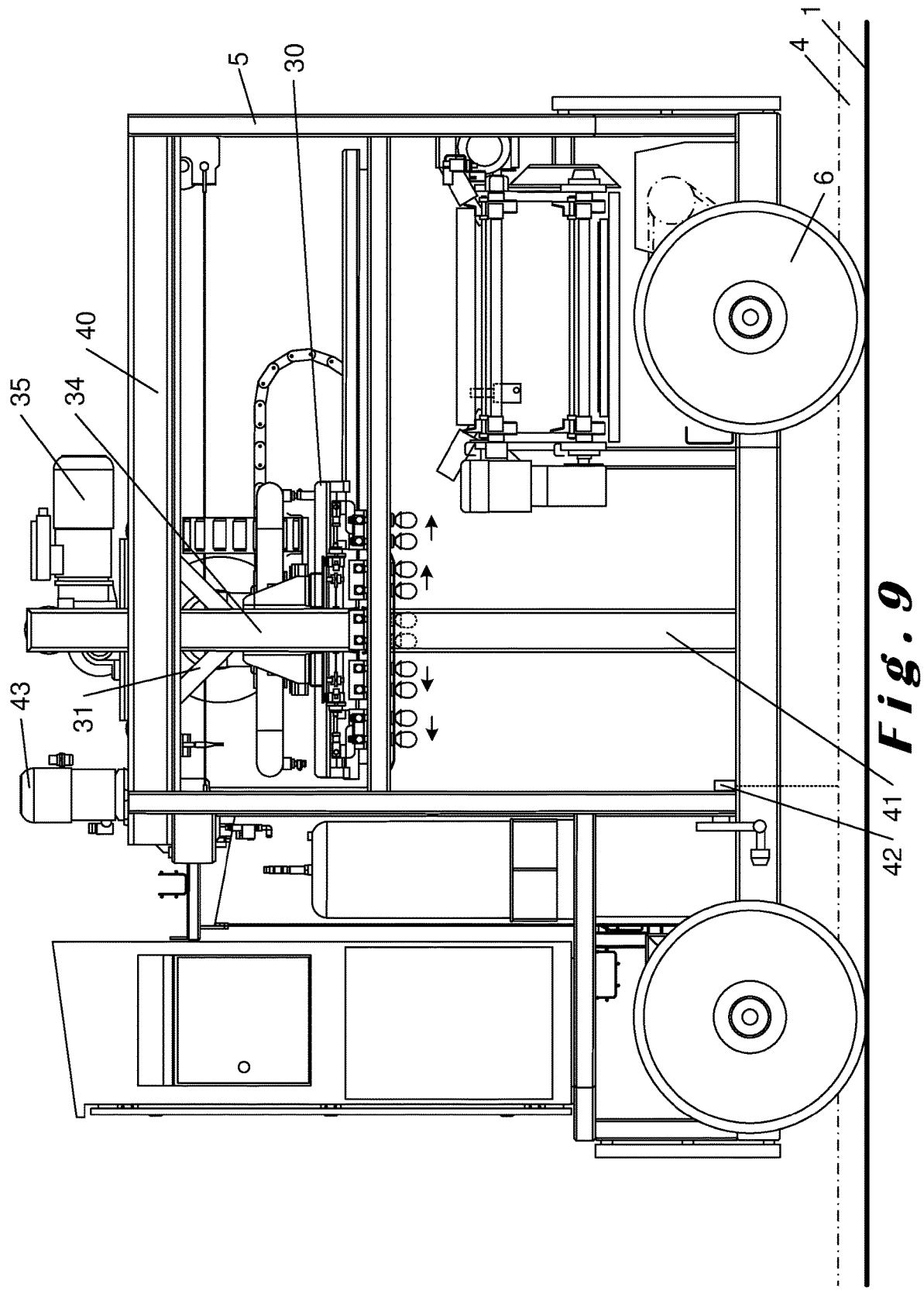
FIG. 9 is the same view as FIG. 8, but the egg pickup members including the eggs picked up therewith are moved to the front of the machine.

In FIG. 9, the second sub-frame 31 has been pulled to its second position by means of the electric motor 43, with the egg pickup members 28 located above the floor of the poultry house instead of above the first transport mechanism 10. During this displacement, the distance between the rows of eggs is preferably increased in such a way that the eggs are at a greater distance from each other in the litter 4 than in the trays 3.

In FIG. 10, the first sub-frame 30 has been lowered by the electric motor 35 to a constant level above the litter 4 as determined by means of the sensor 42. The vacuum is then removed from the egg pickup members 28 in such a way that they push the eggs into the litter 4 with a constant force due to their spring action.

In FIG. 11, the first sub-frame 30 is then pulled up again by means of the electric motor 35.

It will be clear from the above description that it is possible to make various modifications to the machine described as an example without going beyond the scope of protection of the enclosed claims.

The invention claimed is:

1. A transfer machine for transferring, in a poultry house, incubated eggs from trays filled with the incubated eggs to a floor of said poultry house, the transfer machine comprising:
 a frame that rests on a transport system to drive over the floor of the poultry house;
 an input and output system for inserting the trays filled with the incubated eggs into the transfer machine and for removing the emptied trays therefrom; and
 a transfer system for transferring the eggs from the trays that have been inserted into the transfer machine to the floor of the poultry house,
 wherein the transfer system comprises a set of egg pickup members mounted on a first sub-frame which is mounted at least up and down movably on said frame between an uppermost position and a lowermost position for placing the incubated eggs on the floor of the poultry house by means of the egg pickup members,
 wherein said first sub-frame is mounted up and down movably on a second sub-frame,
 wherein said second sub-frame is mounted back and forth movably on said frame between a first position, wherein the set of egg pickup members is situated above the filled trays that have been inserted, and a second position, wherein the set of egg pickup members is situated above the floor of the poultry house and can move up and down between said uppermost and lowermost positions, and
 wherein at least one guide is provided on said second sub-frame for guiding said first sub-frame up and down along said at least one guide.

2. The transfer machine according to claim 1, wherein at least one further guide is provided on said frame, which further guide, in said second position of said second sub-frame, connects to said at least one guide to further guide said first sub-frame up and down into said lowermost position of said first sub-frame.

3. The transfer machine according to claim 2, wherein said at least one guide comprises a first and a second guide, and said further guide comprises a third and a fourth guide, and
 wherein said third guide, in said second position of said second sub-frame, connects to said first guide thereof, and said fourth guide connects to said second guide.

4. The transfer machine according to claim 3, wherein said third and fourth guide are on opposite sides of the transfer machine.

5. The transfer machine according to claim 3, wherein said first, second, third and fourth guides each comprise a rail which extends substantially vertically.

6. The transfer machine according to claim 1, wherein at least one still further guide is provided on said frame for guiding said second sub-frame back and forth along said at least one still further guide.

7. The transfer machine according to claim 1, wherein said input and output system comprises a first transport mechanism which is configured to move the trays filled with the incubated eggs in a first direction to insert these trays into the transfer machine and which is further configured to move the emptied trays also in said first direction to remove these trays from the first transport mechanism.

8. The transfer machine according to claim 7, wherein said first transport mechanism is configured to position two trays filled with incubated eggs under said egg pickup members and wherein said transfer system is configured to simultaneously empty these two trays.

9. The transfer machine according to claim 7, wherein said input and output system comprises a second transport mechanism which extends under said first transport mechanism, and a turning system for receiving the emptied trays that have been removed from the first transport mechanism and for conveying these emptied trays to the second transport mechanism.

10. The transfer machine according to claim 9, wherein said turning system is configured to receive the emptied trays one by one and to convey them one by one to the second transport mechanism.

11. The transfer machine according to claim 10, wherein said turning system comprises a third transport mechanism which is mounted in a tilting manner between a first and a second tilting position on said frame, wherein, in the first tilting position, the third transport mechanism extends in the extension of said first transport mechanism to receive the emptied trays, and wherein, in the second tilting position, the third transport mechanism is tilted obliquely towards the second transport mechanism to convey the emptied trays which have been received by the third transport mechanism to the second transport mechanism.

12. The transfer machine according to claim 9, wherein said second transport mechanism is configured to move the emptied trays in a second direction, which is opposite to said first direction, and wherein the transfer machine has, on one side, an insertion opening for inserting the trays filled with the incubated eggs into the transfer machine and, on the same side, a removal opening for removing the emptied trays from the transfer machine.

13. The transfer machine according to claim 1, comprising a motor to drive said transport system for driving the transfer machine through the poultry house.

\* \* \* \* \*